Figure 1:
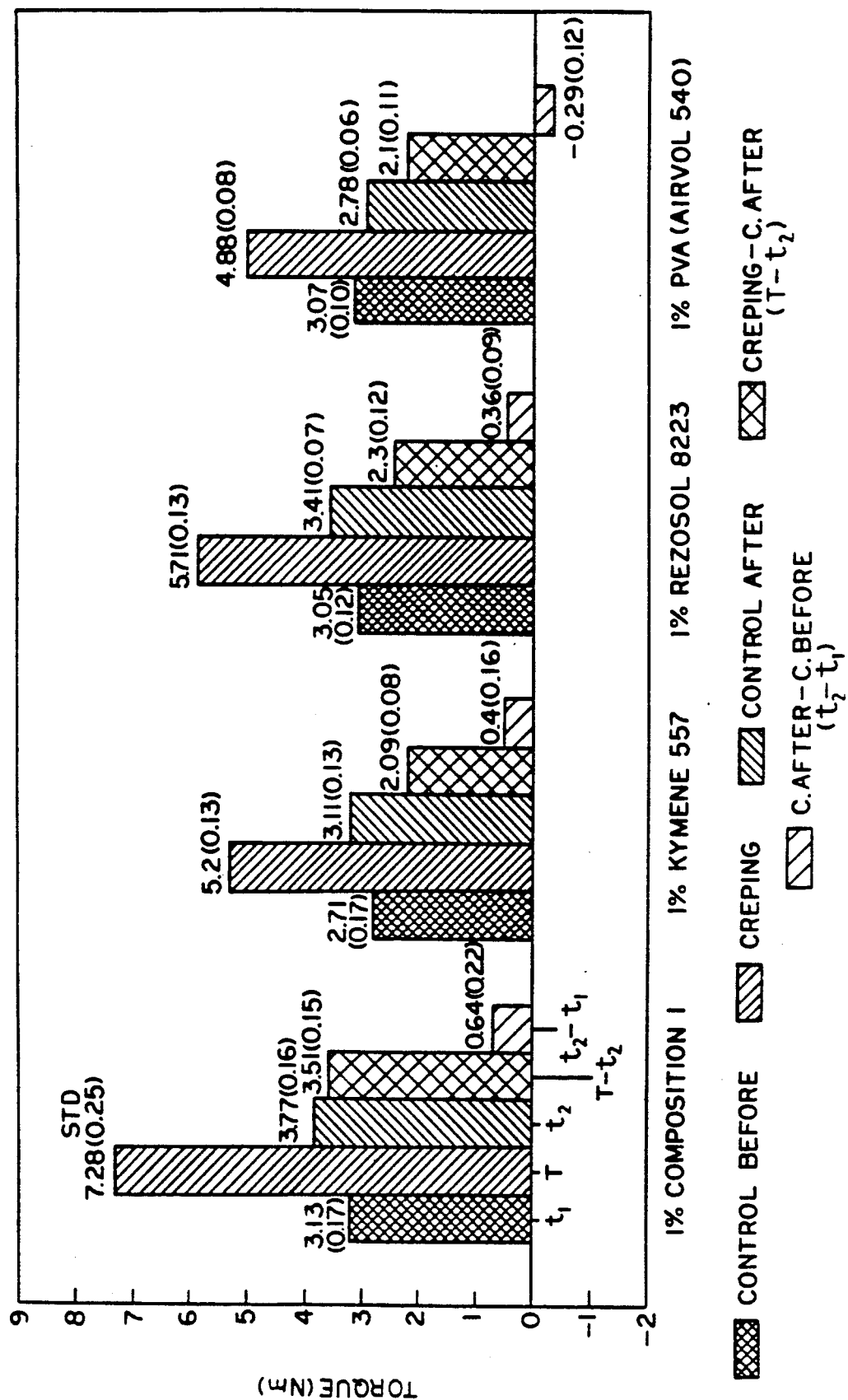

United States Patent [19]

Furman, Jr. et al.

[11] Patent Number: 5,179,150

[45] Date of Patent: Jan. 12, 1993

[54] POLYVINYL ALCOHOLS IN COMBINATION WITH GLYOXLATED-VINYL AMIDE POLYMERS AS YANKEE DRYER ADHESIVE COMPOSITIONS

[75] Inventors: Gary S. Furman, Jr., St. Charles, Ill.; Craig Gruen; Phuong Van Luu, both of Appleton, Wis.

[73] Assignee: Nalco Chemical Company, Naperville, Ill.

[21] Appl. No.: 772,765

[22] Filed: Oct. 7, 1991

[51] Int. Cl.$^5$ .......................... C08K 5/05; B31F 1/14; D21H 11/00
[52] U.S. Cl. ..................... 524/376; 162/111; 162/112; 162/168.3; 264/282; 264/283; 524/503
[58] Field of Search ............. 162/111, 112, 168.3; 264/282, 283; 524/376

[56] References Cited

U.S. PATENT DOCUMENTS

| | | | |
|---|---|---|---|
| 3,556,932 | 1/1971 | Coscia et al. | 162/168.3 |
| 3,926,716 | 12/1975 | Bates | 162/113 |
| 4,304,625 | 12/1981 | Grube et al. | 162/111 |
| 4,448,638 | 5/1984 | Klowak | 162/112 |
| 4,501,640 | 2/1985 | Soerens | 162/111 |

OTHER PUBLICATIONS

Federal Register, vol. 34, No. 118–Friday, Jun. 18, 1971.
CFR, Food and Drugs, 21, Parts 170–199.
Skeist Laboratories, Inc., Water Soluble Polymers III, A Multiple Client Study, Nov. 1983.

Primary Examiner—Paul R. Michl
Assistant Examiner—LaVonda DeWitt
Attorney, Agent, or Firm—John G. Premo; Robert A. Miller

[57] ABSTRACT

Improved creping compositions comprising glyoxylated vinylamide polymers in combination with polyvinyl alcohol are disclosed.

9 Claims, 3 Drawing Sheets 5,179,150

POLYVINYL ALCOHOLS IN COMBINATION WITH GLYOXLATED-VINYL AMIDE POLYMERS AS YANKEE DRYER ADHESIVE COMPOSITIONS

BRIEF DESCRIPTION OF THE INVENTION

The invention comprises adhesive compositions which show good utility when used in the tissue manufacturing process as Yankee dryer coating agents. The adhesive compositions consist of a mixture of water soluble polyvinyl alcohols and glyoxylatedvinyl amide polymers.

BACKGROUND OF THE INVENTION

In the tissue manufacturing process, the paper sheet is dried by means of a steam heated drying cylinder, termed a Yankee. Adhesive materials are used to coat the Yankee surface in order to adhere the wet sheet to the dryer. This improves heat transfer, allowing more efficient drying of the sheet, and most importantly provides the required adhesion to give good creping of the dry sheet. Creping is the process of impacting the sheet into a metal blade, thus compressing the sheet in the machine direction, creating a folded sheet structure. Creping breaks a large number of fiber-to-fiber bonds in the sheet, imparting the qualities of bulk, stretch, absorbency, and softness which are characteristic of tissue. The amount of adhesion provided by the coating adhesive plays a significant role in the development of these tissue properties.

The Yankee coating also serves the purpose of protecting the Yankee and creping blade surfaces from excessive wear. In this role, the coating agents provide improved runability of the tissue machine. As creping blades wear, they must be replaced with new ones. This replacement process represents a significant source of tissue machine downtime, or lost production, as creped product cannot be produced when the blade is being changed. Also a problem, especially with the poly(aminoamide)-epichlorohydrin type creping adhesives is the phenomenon of coating buildup. Resins of this type are described in U.S. Pat. Nos. 2,926,116 and 3,058,873 the disclosure of which are incorporated herein by reference. This problem is evidenced by high spots in the coating, which cause chattering, or bouncing of the crepe blade, against the coated Yankee surface. Blade chatter results in portions of the sheet traveling underneath the crepe blade, causing picks or holes in the sheet. This can lead to sheet breaks and machine downtime.

It is the object of this invention to disclose creping adhesive compositions which provide both improved adhesion and improved machine runability over other adhesive compositions known in the art.

THE DRAWINGS

FIG. 1 compares the composition of the invention versus the prior art.

Figure 2:
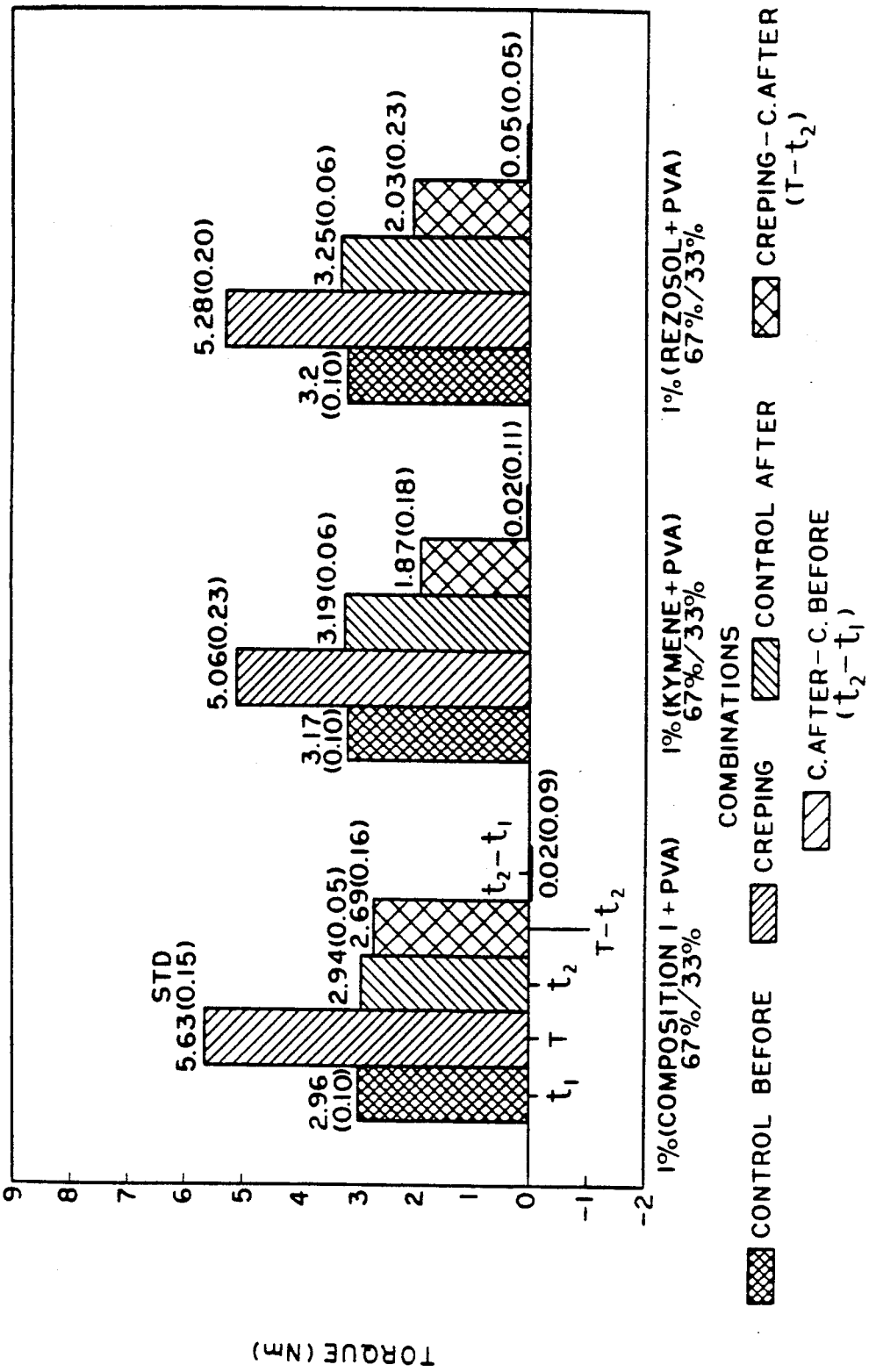

FIG. 2 provides similar data and it shows the ability of the composition of the invention to resist adhesion buildup.

Figure 3:
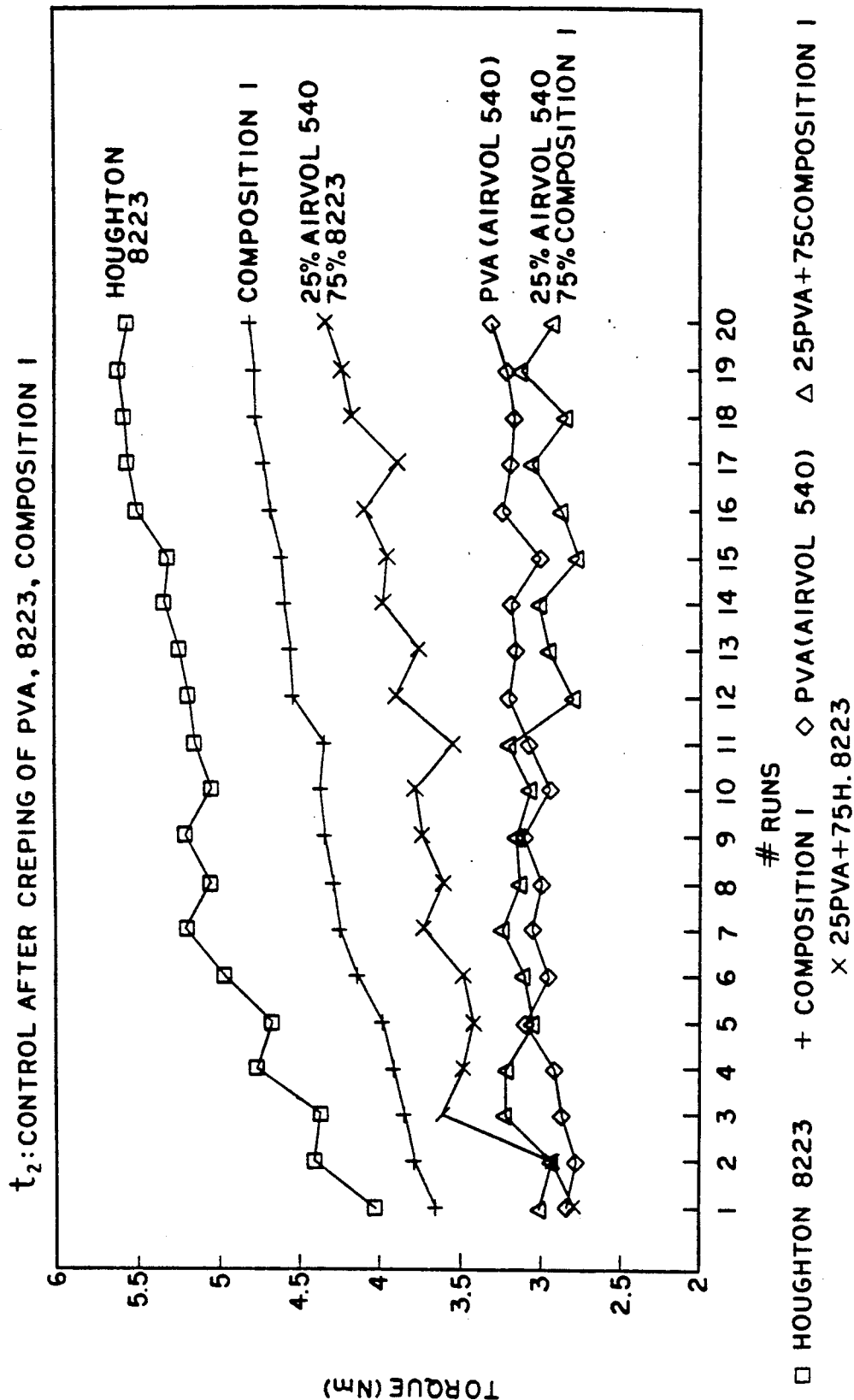

FIG. 3 provides additional data showing the ability of the composition of this invention to resist adhesion buildup.

THE INVENTION

The invention comprises a creping adhesive composition for creping cellulosic webs. It comprises:

a) from 5 to 75 weight per-cent on an active polymer basis of a water soluble vinylamide polymer having sufficient amide substituents and glyoxal substituents to be thermosetting, the ratio of the number of glyoxal substituents to the number of amide substituents being in excess of 0.06:1 and b) from 25 to 95 per-cent by weight of polyvinyl alcohol.

THE GLYOXLATED-VINYL AMIDE POLYMERS

These polymers are described in detail in U.S. Pat. No. 3,556,932, the disclosure of which is incorporated herein by reference. These polymers are water soluble polyvinyl amides, having sufficient -CHOHCHO glyoxal substituents to be thermosetting.

As indicated in 3,556,932 the polymers may contain an ionic component in sufficient quantity to render them substantive to cellulose fibers in aqueous suspensions. The amount of ionic groupings in these polymers is usually small, e.g., less than 10 mole per-cent, but may be as high as 50 mole per-cent. On a weight basis of the active backbone polymer, the glyoxal is added in amounts ranging from 1.0 to 30.0 weight per-cent. For more specificity in respect to minimum amounts of ionic groupings necessary to produce the thermosetting resins, reference should again be had to the disclosure of U.S. Pat. No. 3,556,932.

The most preferred polymer is one that is formed by reacting at a temperature of at least 25° C., and as high as from 50°-100° C., an acrylamide/DADMAC copolymer containing approximately 95 mole per cent acrylamide and five mole per-cent DADMAC and having a weight average molecular weight of about 10,000 to about 25,000 with glyoxal. The glyoxal is added to the base polymer at a weight ratio, based on active backbone polymer. This preferred Yankee Dryer adhesive comprises a copolymer of acrylamide and diallyl dimethyl ammonium chloride containing from about 2.0 to about 10.0 mole per-cent DADMAC and having the molecular weight cited above. This DADMAC copolymer is reacted with from about 1.0 to about 30 weight per cent of the glyoxal, based on (active) backbone polymer.

The method of producing these polymers also is described in further detail in U.S. Pat. No. 3,556,932. The glyoxylated polymers are provided as aqueous solutions of 6-10% active material.

THE POLYVINYL ALCOHOLS

The hydrolyzed polyvinyl alcohols having utility in the invention are those which are water soluble, having a molecular weight up to about 186,000. Such are exemplified by partially hydrolyzed polyvinyl alcohols marketed by the Air Products and Chemicals, Inc.. Per Air Products brochure No. 152-8904, Airvol 540 is reported as having an average molecular weight between 124,000–186,000, is 87 to 89% hydrolyzed and exhibits a viscosity as a 4% aqueous solution of 40-50 centipoises. Airvol 425 is reported as having an average molecular weight between 85,000–146,000 is 95.5–96.5% hydrolyzed and exhibits a viscosity of 25-29 centipoises. In addition to the above described polyvinyl alcohols, others having utility in the invention are described in the book entitled *Polyvinyl Alcohol* by C. Finch, John Wyley and Sons (New York, 1973).

The compositions contain about 25 to 95 weight percent, preferably from about 50 to 87.5 weight percent, and most preferably about 75 weight per-cent, of polyvinyl alcohol. The balance of the compositions is, of course, the active glyoxylated vinyl-amide polymer.

APPLICATION OF THE COMPOSITIONS TO YANKEE DRYERS

The application of the compositions of the invention to Yankee dryers is a three step process comprising:

a) Applying to the surface of a creping cylinder an aqueous admixture of compositions of the invention previously described;

b) Adhering a cellulosic web to the creping cylinder by the above said mixture and;

c) Dislodging the adhered web from the creping cylinder with a doctor blade.

The compositions of the invention are utilized in the forms of dilute aqueous solutions. Preferably, the dilute aqueous admixture of the compositions used to coat the Yankee contains from about 0.05 to about 4 weight per-cent solids, most preferably about 0.1 weight per solids. Those skilled in the art of creping adhesives will appreciate that the reason for such a large percentage of water in the admixture is in part the need to only deposit a very thin layer of adhesive on the creping cylinder, which is most easily accomplished with a spray boom.

EVALUATION OF THE INVENTION

The benefits of the current invention will become evident from the following examples. Examples 1 and 2 deal with the improved adhesion of these compounds.

EXAMPLE 1

The relative adhesion of creping adhesive compositions was measured by means of a peel test. In the test procedure, a paper sample was attached to a metal panel with the adhesive of interest, and peeled at an angle of 90°. The paper substrate used in the test was a filter grade paper. This paper had a basis weight of 78 g/m$^2$. The metal panels, to which the paper was adhered, are standardized test panels produced from low carbon steel and supplied with a smooth finish (surface roughness of 0.2–0.3 $\mu$m).

In the procedure, a 76 $\mu$m film of the adhesive was uniformly applied to a steel test panel by means of an applicator. The paper test strip was carefully applied to the film and rolled once with a weighted roller to achieve uniform contact between the paper, adhesive, and metal panel. The panel with attached paper strip was then mounted on the peel testing apparatus, the surface of which was controlled to a temperature of 100° C. When the sample was stabilized at this temperature, the paper strip was peeled from the panel and the average force needed to accomplish the separation was recorded. The strip was peeled from the panel at a constant effective speed of 43 cm/min.

Table 1 provides data which shows the increased adhesion of the blended components of this invention compared to prior adhesive combinations known in the art. In particular, Table 1 shows the adhesion found for polyvinyl alcohol (PVA; Airvol 540) in combination with Kymene 557H and Rezosol 8223 [poly(aminoamide)-epichlorohydrin resins], compared to PVA in combination with a glyoxylated-poly(acrylamide/DADMAC) resin. The PVA was a commercial product obtained from Air Products, whereas Kymene 557H and Rezosol 8223 are available from Hercules and E. F. Houghton, respectively. It can be clearly seen that the combination of glyoxylated-poly(acrylamide/DADMAC) with PVA resulted in stronger adhesion, than that which could be obtained with the poly (aminomaide)-epichlorohydrin resins, such as taught in U.S. Pat. No. 4,501,640. The increased adhesion occurred even with as little as 10% glyoxylated-poly(acrylamide/-DADMAC) resin.

TABLE 1

| | Peel Adhesion at 1% Total Actives. | | | | |
|---|---|---|---|---|---|
| | % of Total Actives | | | | Average |
| Sample | Airvol 540 | Kymene 557H | Rezosol 8223 | Glyoxylated-poly(AMD/DADMAC) | Adhesion (g/in) |
| 1 | 100 | — | — | — | 20.6 ± 4.6 |
| 2 | — | 100 | — | — | NA |
| 3 | — | — | 100 | — | NA |
| 4 | — | — | — | 100 | 89.2 ± 9.1 |
| 5 | 75 | 25 | — | — | 14.9 ± 2.8 |
| 6 | 25 | 75 | — | — | NA |
| 7 | 75 | — | 25 | — | 15.5 ± 3.0 |
| 8 | 25 | — | 75 | — | NA |
| 9 | 90 | — | — | 10 | 40.4 ± 7.0 |
| 10 | 80 | — | — | 20 | 39.5 ± 6.4 |
| 11 | 75 | — | — | 25 | 36.1 ± 5.2 |
| 12 | 25 | — | — | 75 | 53.7 ± 15.0 |

NA = No Adhesion

EXAMPLE 2

Table 2 provides similar data for an additional PVA, of higher degree of hydrolysis and lower molecular weight, and also for a cationic potato starch (Solvitose N; from AVEBE America, Inc.). Values cannot be compared directly with those in Table 1 due to different methods used to collect and analyze the raw peel data. In general, the method used in Table 2 gives lower values than that used in Table 1. When blended with the PVA and starch components, the glyoxylated-poly(acrylamide/DADMAC) resin again provided improved adhesion over the single components.

TABLE 2

| | Peel Adhesion at 1% Total Actives. | | | |
|---|---|---|---|---|
| | % of Total Actives | | | Average |
| Sample | Airvol 425 | Cationic Starch | Glyoxylated-poly(AMD/DADMAC) | Adhesion (g/in) |
| 1 | 100 | — | — | 17.3 ± 3.6 |
| 2 | — | 100 | — | 14.9 ± 3.3 |
| 3 | — | — | 100 | 75.5 ± 6.4 |
| 4 | 50 | — | 50 | 55.0 ± 2.3 |
| 5 | 33.3 | 33.3 | 33.3 | 21.8 ± 1.4 |

The following examples detail the improved runnability obtained from the compositions of this invention.

EXAMPLE 3

In this example a laboratory device was used to simulate the creping process. The laboratory device, or lab Yankee, consisted of an internally heated cast iron cylinder, approximately 8 in. in diameter ×4 in. wide. The cylinder was equipped with a creping blade and torque sensing device. In normal operation, the lab Yankee was run at a surface temperature of 95° C., a speed of 1 rpm and a crepe blade pressure of 6.5 pli. A preformed, dried paper test strip was saturated with dilute adhesive solution, pressed against the cylinder, dried, and creped off.

Three torque measurements were recorded, with the blade against the cylinder. The torque measurement, $t_1$, was recorded against the clean cylinder, before the paper test strip was applied, and represented the baseline torque value. The value, T, was recorded when the test strip was creped from the cylinder, and relates to the relative resistance of removing the strip from the Yankee cylinder. Finally, the value, $t_2$, was recorded following the removal of the test strip,, and was taken as a relative measure of the adhesive residue left on the cylinder. The calculated values, $T-t_2$ and $t_2-t_1$ were then taken as relative measures, respectively of the adhesion of the paper to the Yankee cylinder, and the presence of residual adhesive left on the cylinder. An increase in $T-t_2$ was interpreted as positive since this would indicate increased adhesion, and should lead to improved sheet properties. Oppositely, an increase in $t_2-t_1$ was seen as negative, since this increase in $t_2-t_1$ can be interpreted as related to an adhesive buildup on the Yankee. In commercial practice, adhesive buildup is not desirable as it eventually leads to crepe blade "chatter" and subsequently poor creping and sheet quality due to picking.

FIG. 1 shows data comparing these values for the glyoxylated-poly(acrylamide/DADMAC): [5 mole % DADMAC, 30 Wt. % glyoxal to backbone polymer; shown as Composition 1], Kymene 557H, Rezosol 8223, and PVA. In comparing these results, composition 1, provided the highest adhesion, or highest "T" value. On the other hand, the PVA had the least detrimental effect, in terms of adhesive buildup, and in fact created a "lubricating" effect (negative $t_2-t_1$)

FIG. 2 provides similar data for the adhesive combined with PVA (66.6% adhesive/33.3% PVA). In this experiment, the composition 1-PVA combination provided the highest adhesion with no residual adhesive buildup.

EXAMPLE 4

FIG. 3 provides additional evidence as to the desirability of the PVA/Composition 1 combination in terms of resisting adhesive buildup. In FIG. 3, twenty consecutive test were performed with no cleaning of the Yankee cylinder between tests. As can be seen, the $t_2$ values of the individual adhesives, increased with successive tests, indicating an adhesive buildup. The $t_2$ value for the PVA adhesive, by itself, remained constant. The combination of PVA and the Houghton 8223 poly(aminoamide)epichlorohydrin polymer increased in $t_2$ value, also indicating adhesive buildup. The PVA Composition 1 combination provided the strongest adhesion and the $t_2$ values remained unchanged after twenty tests. This indicated little tendency for the adhesive to build up, and was interpreted as leading to improved runability of the tissue machine.

EXAMPLE 5

The compositions of this invention were trialed on a pilot tissue machine. This machine had a trim of 24" and was run at a wire speed of 3500 ft/min. Tissue was produced from a 50/50 furnish blend of SSWK/SHWK at a basis weight of 9.6 lb/3000 ft$^2$. The sheet was creped at a moisture content of 4% and a crepe ratio of 18%. Adhesive materials of this invention were sprayed directly on the Yankee dryer at the rate of 0.4 dry lb. adhesive/ton product. A hydrocarbon release oil was also sprayed on the Yankee at the rate of 1-3 lb/ton. Adhesive compositions utilized had a range from 87.5 to 25% PVA with the rest of the blend consisting of glyoxylated-poly (acrylamide/DADMAC). However, the best runability, as determined by visual observation, occurred in the range from 87.5 to 75% PVA. In this range, no coating buildup was observed, and no picking of the sheet at the crepe blade occurred.

We claim:

1. A creping composition for creping cellulosic webs comprising:
   a) from 5 to 75 weight per-cent of a water ,soluble vinylamide polymer having sufficient amide and glyoxal substituents to be thermosetting, the ratio of the number of glyoxal substituents to the number of amide substituents being in excess of 0.06:1 and
   b) from 25 to 95 per-cent by weight of polyvinyl alcohol.

2. The creping adhesive composition of claim 1 where the water soluble vinyl amide polymer is a cationic water soluble polymer.

3. The creping adhesive composition of claim 2 where the cationic water soluble copolymer has a molar ratio of 95% acrylamide and 5% diallydimethyl ammonium chloride.

4. The creping adhesive of claim 1 where (b) is present in an amount ranging from 70-95% by weight.

5. A method for creping cellulosic webs comprising:
   a) Applying to a rotating creping cylinder a dilute aqueous solution of the composition of claim 1.
   b) Pressing a cellulosic web against the creping cylinder to effect adhesion of the web to the surface of the cylinder; and
   c) Dislodging the web from the creping cylinder by contact with a doctor blade.

6. The method of claim 5 where the composition is of claim 2.

7. The method of claim 5 where the composition is of claim 1.

8. The method of claim 5 where the composition is of claim 3.

9. The method of claim 5 where the composition is of claim 4.

* * * * *